United States Patent
Kim et al.

(10) Patent No.: US 9,141,952 B2
(45) Date of Patent: Sep. 22, 2015

(54) EGM AUTHENTICATION MECHANISM USING MULTIPLE KEY PAIRS AT THE BIOS WITH PKI

(71) Applicant: IGT, Las Vegas, NV (US)

(72) Inventors: John Hongjip Kim, Reno, NV (US); Melih Ozmen, Reno, NV (US); Warner R. Cockerille, IV, Sparks, NV (US); Ali R. Gulbag, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/249,083

(22) Filed: Apr. 9, 2014

(65) Prior Publication Data

US 2014/0250299 A1 Sep. 4, 2014

Related U.S. Application Data

(62) Division of application No. 12/354,303, filed on Jan. 15, 2009, now Pat. No. 8,768,843.

(51) Int. Cl.
*H04L 29/06* (2006.01)
*G06Q 20/38* (2012.01)
*G06F 21/51* (2013.01)
*H04L 9/08* (2006.01)
*H04L 9/32* (2006.01)
*G06F 21/10* (2013.01)

(52) U.S. Cl.
CPC .............. *G06Q 20/382* (2013.01); *G06F 21/51* (2013.01); *H04L 9/0891* (2013.01); *H04L 9/3247* (2013.01); *H04L 9/3268* (2013.01); *H04L 63/068* (2013.01); *H04L 63/0823* (2013.01); *G06F 21/10* (2013.01); *G06F 2211/008* (2013.01); *H04L 2209/127* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 6,149,522 A | 11/2000 | Alcorn et al. | |
| 6,510,521 B1 | 1/2003 | Albrecht et al. | |
| 6,804,763 B1 | 10/2004 | Stockdale et al. | |
| 6,863,608 B1 | 3/2005 | LeMay et al. | |
| 7,111,141 B2 | 9/2006 | Nelson | |
| 7,384,339 B2 | 6/2008 | LeMay et al. | |
| 7,461,249 B1 | 12/2008 | Pearson et al. | |
| 7,515,718 B2 | 4/2009 | Nguyen et al. | |
| 7,819,750 B2 | 10/2010 | Lam et al. | |
| 8,088,001 B2 | 1/2012 | Preisach | |
| 8,296,561 B2 * | 10/2012 | Kanemura et al. | 713/155 |
| 2001/0007131 A1 | 7/2001 | Galasso et al. | |

(Continued)

OTHER PUBLICATIONS

Kaliski, B. et al., "Cryptographic Message Syntax Version 1.5", PKCS #7, RSA Laboratories, East, Mar. 1998, 32 pp.

(Continued)

*Primary Examiner* — Calvin Cheung
(74) *Attorney, Agent, or Firm* — Neal, Gerber & Eisenberg LLP

(57) ABSTRACT

Executable applications on a gaming machine are verified before they can be executed, for security purposes and to comply with jurisdictional requirements. Unlike in prior systems for authenticating the executable applications, embodiments allow for new executable applications to be provided and verified over time with different private and public key pairs, even after the operating code of the gaming machine is certified by the jurisdiction and deployed in the field.

23 Claims, 9 Drawing Sheets

(56) References Cited

U.S. PATENT DOCUMENTS

| | | |
|---|---|---|
| 2003/0037237 A1 | 2/2003 | Abgrall et al. |
| 2004/0266533 A1 | 12/2004 | Gentles et al. |
| 2006/0242413 A1 | 10/2006 | Fujishiro et al. |
| 2006/0253702 A1 | 11/2006 | Lowell et al. |
| 2007/0011724 A1 | 1/2007 | Gonzalez et al. |
| 2007/0054741 A1 | 3/2007 | Morrow et al. |
| 2008/0009344 A1 | 1/2008 | Graham et al. |
| 2008/0153588 A1 | 6/2008 | Muir et al. |
| 2008/0167132 A1 | 7/2008 | Gatto et al. |
| 2008/0172557 A1* | 7/2008 | Crowder et al. ............ 713/2 |
| 2008/0254850 A1 | 10/2008 | Sylla |
| 2009/0016527 A1 | 1/2009 | Vigarie et al. |
| 2010/0227680 A1 | 9/2010 | Leopold et al. |
| 2010/0287363 A1 | 11/2010 | Thorsen |

OTHER PUBLICATIONS

Myers, M. et al., "X.509 Internet Public Key Infrastructure Online Certificate Status Protocol—OCSP", RFC 2560, Entrust Technologies, Jun. 1999, 23 pp.

* cited by examiner

EGM AUTHENTICATION MECHANISM USING MULTIPLE KEY PAIRS AT THE BIOS WITH PKI

CROSS-REFERENCE TO RELATED APPLICATIONS

This application is a divisional of U.S. patent application Ser. No. 12/354,303, entitled "EGM AUTHENTICATION MECHANISM USING MULTIPLE KEY PAIRS AT THE BIOS WITH PKI," filed on Jan. 15, 2009, which is herein incorporated by reference in its entirety and for all purposes.

BACKGROUND

The present invention relates generally to wager based gaming devices and systems, and more specifically allowing games to be developed over time and authenticated at gaming machines according to the high security requirements and rigid certification requirements of gaming jurisdictions.

Executable software applications that run on electronic wager based games should be authenticated prior to execution. This is to ensure that the applications in the gaming machine are not tampered with, for example, to change the odds of winning in one's favor. Such security is also required by various gaming jurisdictions. Certain jurisdictions require that the gaming machine authenticates all of its software when the machine powers on, and, at least every 24 hours thereafter. In prior systems, security techniques relied upon providing the keys of the providers of the applications, together with the software code responsible to authenticate the applications using the keys, in a protected memory of the gaming machine. The application author's specific keys were typically provided in hardware and, for a new application to be authenticated, the hardware needed to be replaced. Likewise, in the event of the expiration or unavailability of a key, the hardware needed to be replaced. While this provides a high level of security, it also results in extremely limited flexibility in terms of providing and verifying new applications for a gaming machine after it has been deployed, and makes maintaining such machines and related systems difficult when certain providers are no longer available.

SUMMARY

Embodiments provide a solution that enables manufacturers to migrate from old to new security modules and mechanisms without disrupting the security procedures as approved by regulatory agencies. Future key expiration will not require hardware changes, and new applications may be authenticated without requiring new hardware.

One class of embodiments utilizes multiple public keys in BIOS to mitigate the risk of security module failures. In addition, embodiments also provide extensible code signing capabilities to gaming machines with a Public Key Infrastructure ("PKI"). According to these embodiments, a gaming machine can authenticate any software that is signed by any private key as long as its corresponding public key is authorized by a trusted certificate authority, preferably with an industry standard, such as the 'x.509' certificate.

One embodiment relates to a wager based gaming machine. The gaming machine comprises a bill validator or cashless credit acceptor; a mass storage volume; a microprocessor; a hardware security module; read only basic input output system ("BIOS") chip; a first public key embedded within the BIOS chip. The first public key is configured to authenticate software in the gaming machine. A second public key is also embedded within the BIOS chip, and the second public key is configured to replace the first public key when the first public key expires or when the first public key fails to authenticate an executable within the gaming machine. In one variation, the second public key is that of a code signing certificate authority.

Another embodiment relates to a wager based gaming machine that comprises a microprocessor; an operating system stored in the mass storage volume; a gaming application; a read only basic input output system ("BIOS") chip; and BIOS operating instructions stored within the read only BIOS chip. The gaming machine is configured by the operating system and the BIOS operating instructions to: receive a certificate revocation list; authenticate the certificate revocation list; store the authenticated certificate revocation list in the mass storage volume; validate that a public key is certified by a code signing certificate authority; utilize the certificate revocation list in the mass storage volume to ascertain whether the code signing certificate authority has revoked a code signing certificate issued to the code signing authority; and authenticate the gaming application using the validated public key.

Another embodiment relates to a method for providing and verifying gaming software for use in a gaming machine and operating the gaming machine in a casino gaming environment. The method comprises: providing a read only BIOS chip within an electronic gaming machine; providing a microprocessor within the electronic gaming machine, the microprocessor configured to execute BIOS instructions of the read only BIOS chip. The BIOS instructions are configured to: check the validity of a public key of a code signing certificate authority; terminate operation of the gaming machine if the public key of the code signing authority is not determined to be valid or trusted; check the game code with the public key of the code signing authority if the public key is determined to be valid and trusted; check the authenticity of an operating system of the gaming machine; and cause the gaming machine to execute the operating system if the authenticity of the operating system is determined authentic.

Yet another embodiment relates to a system for providing and verifying gaming software for use in a wager based gaming machine. The system comprises a certificate authority configured to receive authorization of a gaming machine manufacturer to sign executable code of the gaming application on behalf of the gaming machine manufacturer. The certificate authority is configured to delegate authority to sign the executable code to a code signing authority on behalf of the gaming machine manufacturer. The code signing authority is configured to receive authorization from the certificate authority and sign the executable code of the gaming application on behalf of the gaming machine manufacturer. The system also comprises an electronic gaming machine comprising a read only BIOS chip and a public key of a code signing certificate authority embedded within the BIOS chip. The gaming machine is configured to execute BIOS instructions of the read only BIOS chip, and the BIOS instructions are configured to: check the validity of the public key of the code signing certificate authority; terminate operation of the gaming machine if the public key of the code signing authority is not determined to be valid and trusted; check game code with the public key of the code signing authority if the public key is determined to be valid and trusted; check the authenticity of an operating system of the gaming machine; terminate operation of the gaming machine if the authenticity of the operating system is not determined to be authentic; and cause the gaming machine to execute the operating system if the authenticity of the operating system is determined authentic.

A further understanding of the nature and advantages of the present invention may be realized by reference to the remaining portions of the specification and the drawings.

DETAILED DESCRIPTION

Exemplary applications of systems and methods according to the present invention are described in this section. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

In the following figures, method and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of gaming devices, such as bill/ticket validators, printers, mechanical displays, video displays, coin hoppers, light panels, input buttons, touch screens, key pads, card readers, audio output devices, etc., may be coupled to the gaming machine. The gaming devices may be controlled by a master gaming controller executing authenticated software to provide a gaming interface for a game play experience on the gaming machine.

Figure 1A:
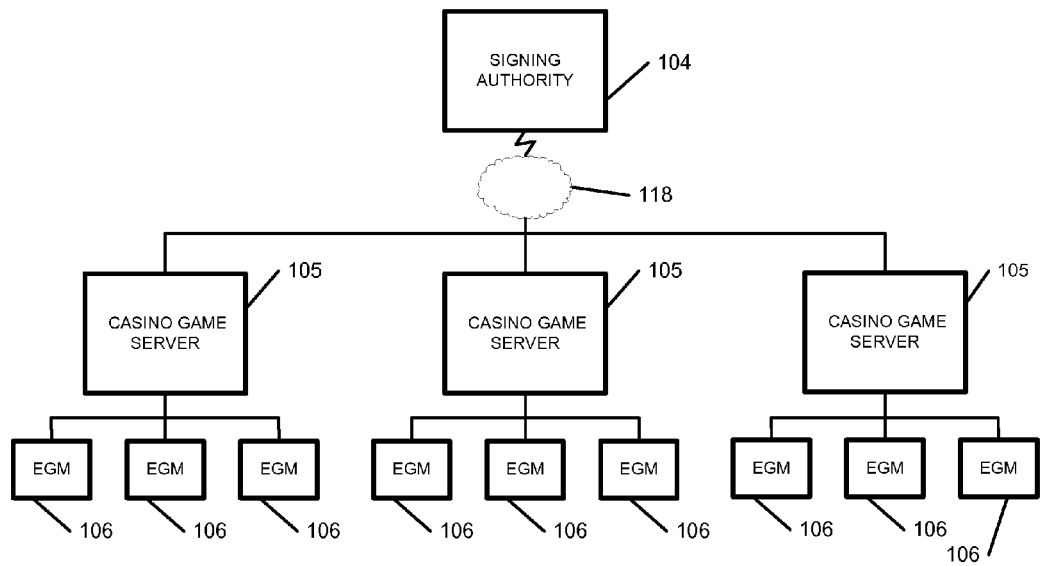
FIG. 1A illustrates a number of casino gaming machines in communication with a trusted intermediary via servers.
Figure 1C:
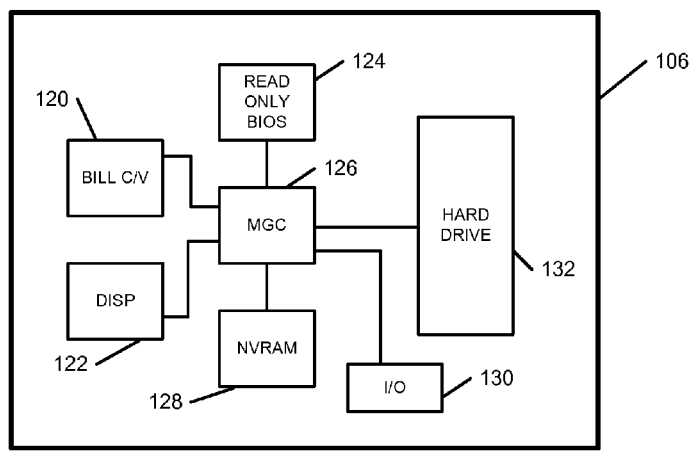
FIG. 1C is a block diagram of an exemplary EGM.
Figure 1B:
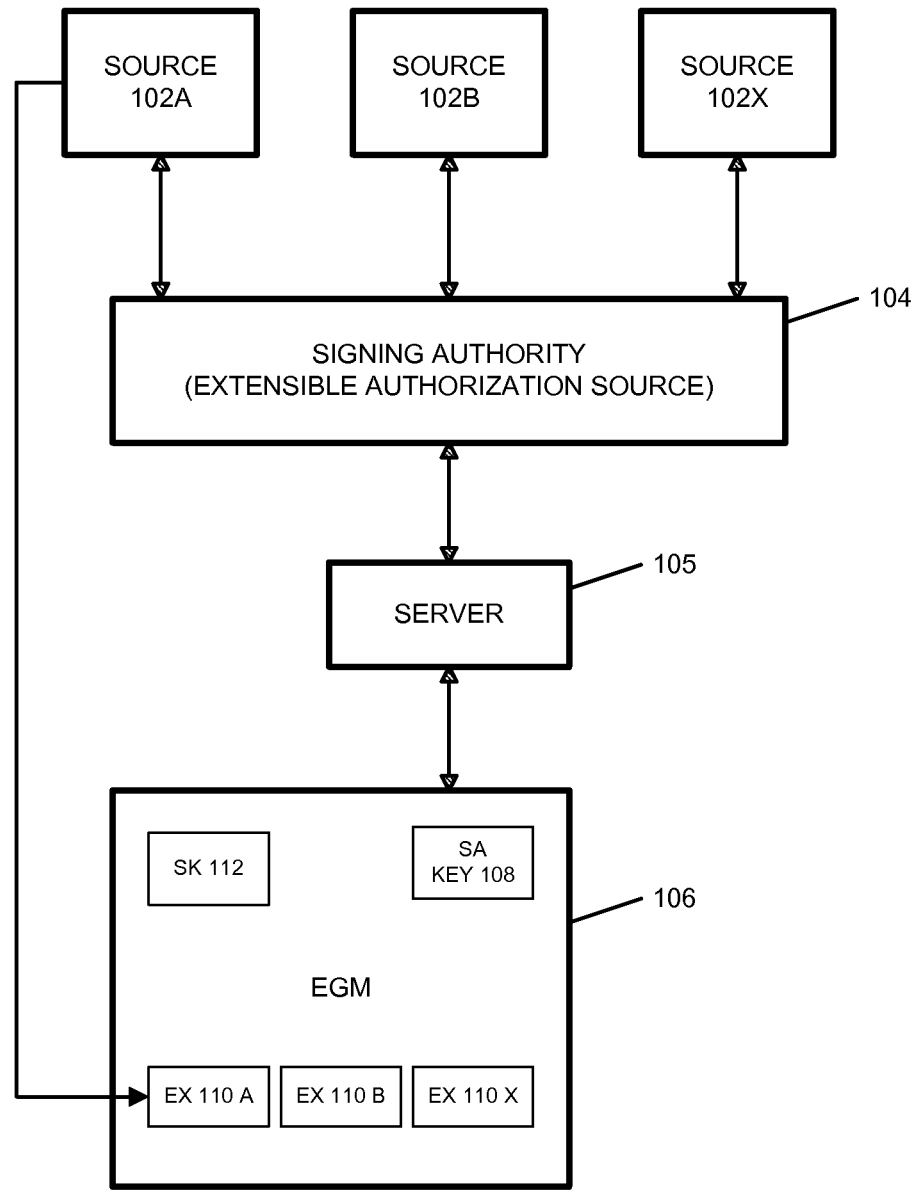
FIG. 1B illustrates application sources and applications within an electronic gaming machine ("EGM").

FIGS. 1A, 1B, and 1C illustrate EGM 106. In FIG. 1A, numerous groups of EGM's 106 are networked to and communicate with a casino server 105. The networked servers 105 and EGM's 106 may be deployed within one gaming establishment or may be distributed at different gaming establishments. Casino servers 105 may communicate with each other over wide area network 116 and with signing authority 104. Certain embodiments may include access to the Internet 118, although communication to signing authority 104 may in certain embodiments preferably be made via a private network connection. In jurisdictions or other scenarios where Internet connections to the gaming network are undesirable due to potential security concerns, information may be passed to and from the signing authority via portable media without the network connection.

As seen in FIG. 1B, each EGM 106 may have numerous different executable applications 110A-110X. The executable applications may comprise any type of application but are most often games or game related applications. Executable application ("EX") 110A is from source 102A, whereas executable application 110B is from source 102B, and executable 110X is from source 102X etc. Source 102A may be the software published by the manufacturer of EGM 106, and in some instances, the EX 110 may be a legacy application previously installed in deployed EGMs. In such a case, the public key 112 of source 102A ("source key" 112 or "SK" 112) is stored in a nonvolatile memory of the EGM. EGM 106 also comprises signing authority ("SA") public key 108. EX 110B-X, from sources 102B-X, are encrypted or signed with the private key that corresponds to the public key, i.e. SA key 108. The code signing certificate authority may revoke the code signing certificate that has been issued to the signing authority 104. The code signing certificate authority may issue the CRL which shows when the certificate was revoked. After the revocation, the code signing verification application in the EGM must terminate the EGM's operation if it discovers that there is software in the EGM that is signed by the signing authority 104 after its code signing certificate issued is revoked. Any software that is signed before the code signing certificate of 104 is expired or revoked should be trusted by the code signing verification utility in the EGM. The architecture utilizing signing authorities is flexible, and the signing authorities can sign code for different sources, the authenticity of which can be verified at any time. Using SA public key 108, an application written by any source, if properly authenticated and validated, may be executed or eligible for execution. Note that EX 110 may additionally or alternatively be signed by SA key 108.

Figure 1D:
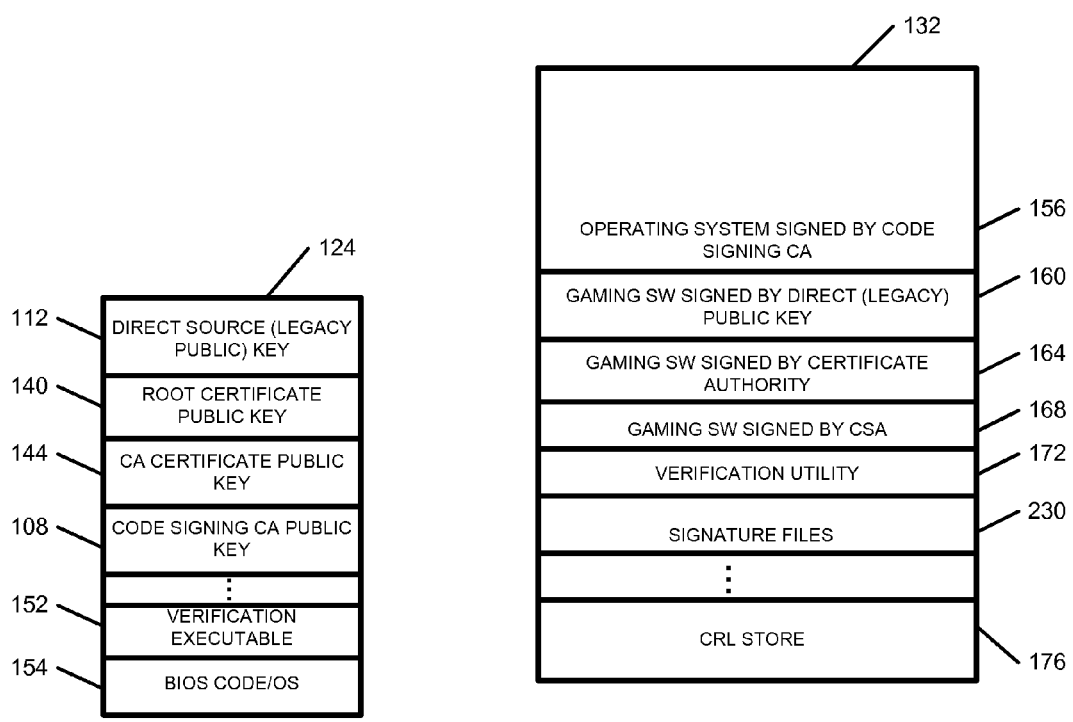
FIG. 1D illustrates memory space of nonvolatile memory 124 and mass storage drive 132.

As seen in FIG. 1C, EGM 106 comprises master gaming controller ("MGC") 126, a microprocessor that controls the operation of the device and communicates with bill collector/validator 120, which may accept currency or any cashless voucher or electronic payment. Collector 120 may also comprise player tracking functionality and perform credit and debit operations to a player's account. EGM 106 also comprises display 122, read only BIOS chip 124, NVRAM 128, input/output devices 130, and mass storage drive 132. Mass storage drive 132 may be a magnetic hard disk drive, solid state drive, or any other type of mass storage device. Mass storage device 132 may alternatively be referred to as hard drive 132, although as mentioned above it may be a different type of mass storage device. FIG. 1D illustrates some contents of read only BIOS chip ("ROBC") 124 and mass storage device 132 in an embodiment that utilizes a public key infrastructure ("PKI"). Note that while preferably utilized, a PKI need not be utilized and that usage of public/private key pairs does not necessarily require usage of a PKI.

Stored within ROBC 124 are direct source public key 112, which is preferably a public key of a private/public key pair, and which in certain instances may be the public key of the EGM manufacturer or other source of applications to previously installed (legacy) applications. Source public key 112 ensures that a new EGM with BIOS chip 124 can also play popular legacy games. Also stored within ROBC 124 are a root certificate authority public key 140, a certificate authority public key 144, and a code signing certificate authority public key 108. Public keys 140, 144, and 108 ensure that an EGM can also authenticate software that is published or signed by a code signing authority whose certificate is issued by a code signing certificate authority. The public key 140 and 144 are optional in that the code signing CA public key 108 is stored in the read-only BIOS of 124. The verification executable only need to ensure that the code signing certificate that was issued by the code signing certificate is issued by the trusted code signing CA using the code signing certificate 108 that is embedded in the read only BIOS. The public key 140 and the public key 144 is may be useful if the parent CA to the Code Signing CA revoked the Code Signing CA, and issued a new code signing CA certificate. In this case, the public key of the code signing CA public key can no longer be used, and only the CA certificate public key 144 must be used to authenticate the code signing CA public key. The public keys may be stored directly or within a certificate such as an X.509 certificate. An entire X.509 certificate must be signed by issuing certificate authorities ("CAs"). Note that keys 140 and 144 are optional and that certificate or key 108 may be chained to the root certificate via certificate chaining ROBC 124 also comprises verification executable 152, which in one embodiment is implemented in accordance with Public Key Cryptography Standard #7 ("PKCS#7"). For more information on PKCS #7, a Cryptographic Message Syntax Standard, please refer to an RSA Laboratories Technical Note, Version 1.5 (or later) Revised Nov. 1, 1993, and hereby incorporated by reference in the entirety. ROBC 124 also comprises the BIOS code and BIOS operating system 154.

Figure 2A:
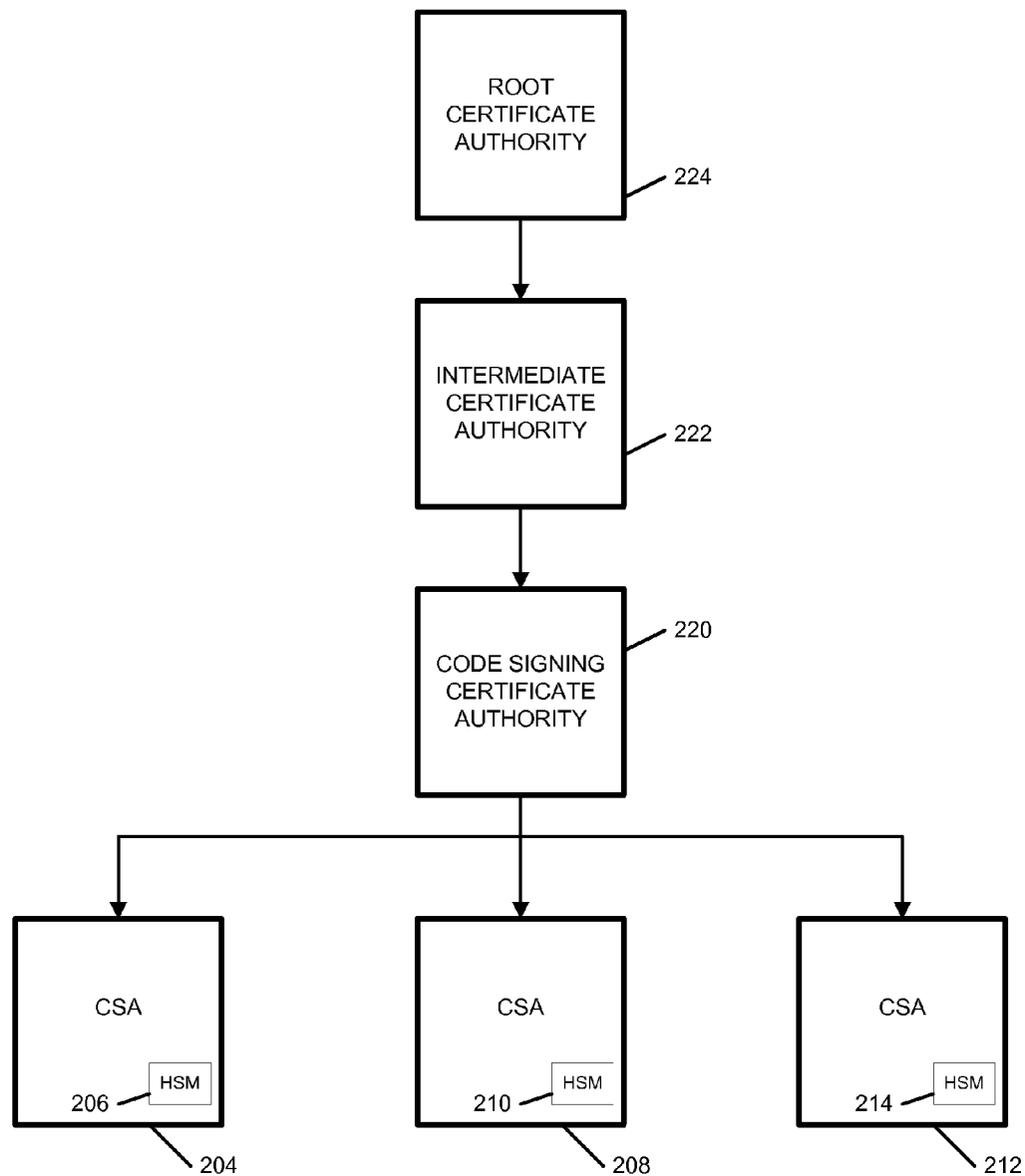
FIG. 2A illustrates a public key infrastructure, according to an exemplary embodiment.

Referring to FIGS. 1D and 2A, drive 132 comprises an operating system 156 signed by a code signing CA and also comprises gaming software 160 (e.g. an executable and/or DLL file) signed by a private key of the corresponding public key such as key 112. Each executable application that is signed will have a signature file, as represented by signature files 230, which will be discussed later in greater detail. Drive 132 may also comprise gaming SW 164 signed by a certificate authority, such as root certificate authority 224, or intermediate certificate authority 222, and gaming SW 168 signed by code signing certificate authority 220. Drive 132 may also comprise verification utility or executable 172, which in one embodiment is implemented in accordance with Public Key Cryptography Standard #7 ("PKCS#7"). Drive 132 also comprises signature files 230 and one or more certificate revocation lists 176 in PKI implementations.

The root certificate authority 224 is the root of trust in a PKI. Root CA 224 may issue certificates directly to code signing authorities 204, 208, or 212 etc, or may delegate that power to intermediate certificate authority 222, or code signing certificate authority 220, both of which are optional. Intermediate certificate authority 222, and code signing certificate authority 220 allow for greater flexibility in implementation, for example in large infrastructures with distributed offices or responsibilities. The code signing certificate authority 220 issues certificates and spawns code signing authorities ("CSAs"). For example one CSA may be operated by one corporate entity while another is operated by a different corporate entity, and one CSA may be located in Australia for example while another is located in North America. In a preferred embodiment, a CSA cannot issue a certificate, but can sign executable code. A certificate may comprise some or all of the following: Certificate; Version; Serial Number; Algorithm ID; Issuer; Validity; Not Before; Not After; Subject; Subject Public Key Info; Public Key Algorithm; Subject Public Key; Issuer Unique Identifier; Subject Unique Identifier; Extensions; Certificate Signature Algorithm; and Certificate Signature. The restriction on the CSA from issuing the code signing certificate can be enforced by the Code Signing CA by issuing the code signing certificate to the Code Signing Authority with the Extensions in the x.509 certificate that explicitly allows only the code signing usage.

In certain embodiments the CSAs comprise a discrete hardware security module ("HSM") (e.g. 206, 210, 214) to protect the private key of the CSA, and also to sign the executables. Hardware security modules are typically certified to meet very high security standards and if tampered with will become disabled. The HSM protects the private key of the Code Signing Authority such that the private key is never exposed outside of the HSM. For example, an HSM may be Federal Information Processing Standard ("FIPS") validated according to the US National Institute of Standards or RoHS compliant. The RoHS Directive stands for "the restriction of the use of certain hazardous substances in electrical and electronic equipment". The RoHS Directive is from the United Kingdom and for more information please refer to http://www.rohs.gov.uk/. One example of a currently available HSM is provided by SafeNet and can be seen at http://www.safenet-inc.com/. HSMs may also be employed by the certificate authorities 220-224, although the functionality may be directly integrated into the CA without use of an HSM.

Figure 2B:
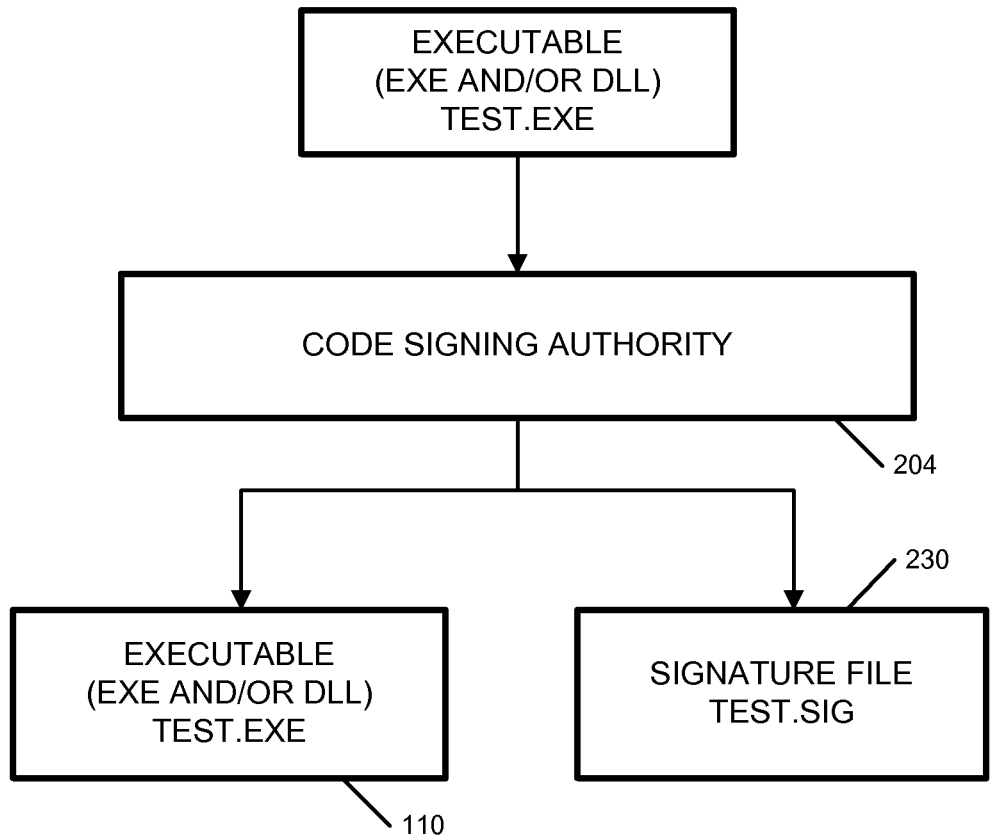
FIG. 2B is a diagram illustrating functional relationships in code signing.

FIG. 2B illustrates the functional relationships of code signing. An executable such as executable 110, which may be any type of executable file but typically includes an .exe or .dll (library) type file (in a Microsoft environment), is signed by a CSA such as CSA 204. As a result, a signature (.sig) file 230 will be created and is associated with the executable. Signing comprises generating a hash value of the executable according to well known hash algorithms such as SHA-1, MD5 etc., and encrypting the hash value using a private key. In an embodiment where an HSM is present, the hash value of the executable will be created by CSA application using the computer hardware such as the processor, memory etc. and the hash value will be sent to the HSM. The HSM then encrypts the hash value using the CSA private key stored in HSM.

Figure 2C:
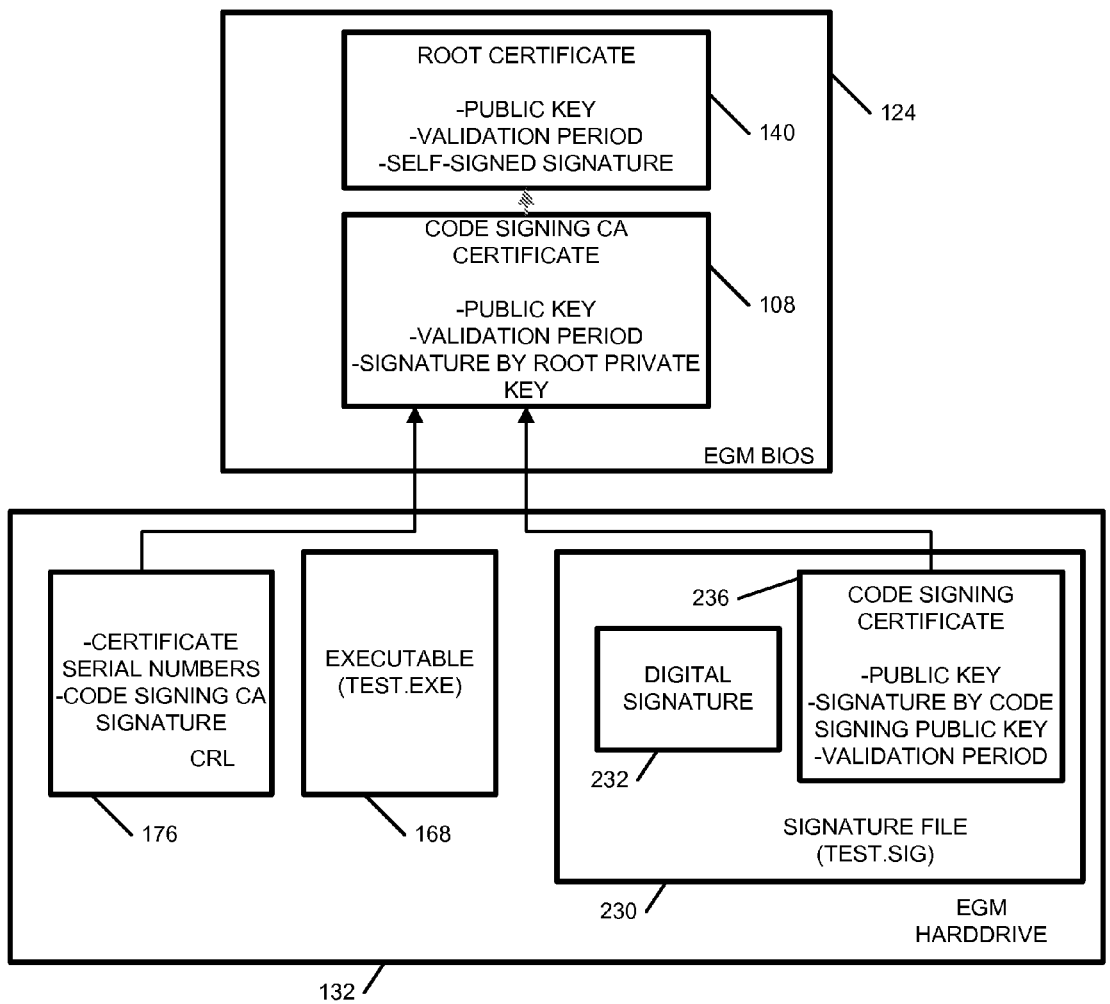
FIG. 2C is a diagram illustrating functional relationships in certificate chain validation.

FIG. 2C illustrates the functional relationships of certificate chain validation. Within EGM BIOS are the root certificate 140 and code signing CA certificate 108. Root certificate 140 is optional and only present in certain embodiments. In cases where an intermediate certificate authority 222, as seen in FIG. 2A is present, the intermediate authority's certificate may also be included in BIOS 124. In each of the certificates the public key, validation period, and signature are shown, although as discussed above, a certificate may contain much more information.

Within EGM drive 132 are stored the CRL 176, executable (e.g. 168) and signature file 230. Signature file 230 comprises digital signature 232, and the code signing certificate 236. Code signing authority certificate 236 comprises the public key of the CSA, the signature of the code signing CA private key, and the validation period.

The verification utility 152 (if the BIOS code is controlling) or 172 generates the hash value of the executable (e.g. test.exe; test.dll) and compares it to the hash decrypted using the public key of the code signing certificate stored in the signature file 230. The utility may also check the validity period and check if the certificate has been tampered with by validating it against the signature of the code signing CA in the certificate 236, using the Code Signing CA public key in 108 in the BIOS. Other material within the certificate may also be verified. In another embodiment, the EGM read only BIOS chip has the hash value of the code signing CA certificate 108, and the signature file also contains the code signing CA certificate 108. The code signing verification application verifies that the code signing certificate 236 is issued by the code signing CA with the certificate chain validation using the code signing CA certificate 108, and then compares the hash value of the certificate 108 in the read only BIOS chip with the hash value of the certificate 108 in the signature file 230.

Figure 3:
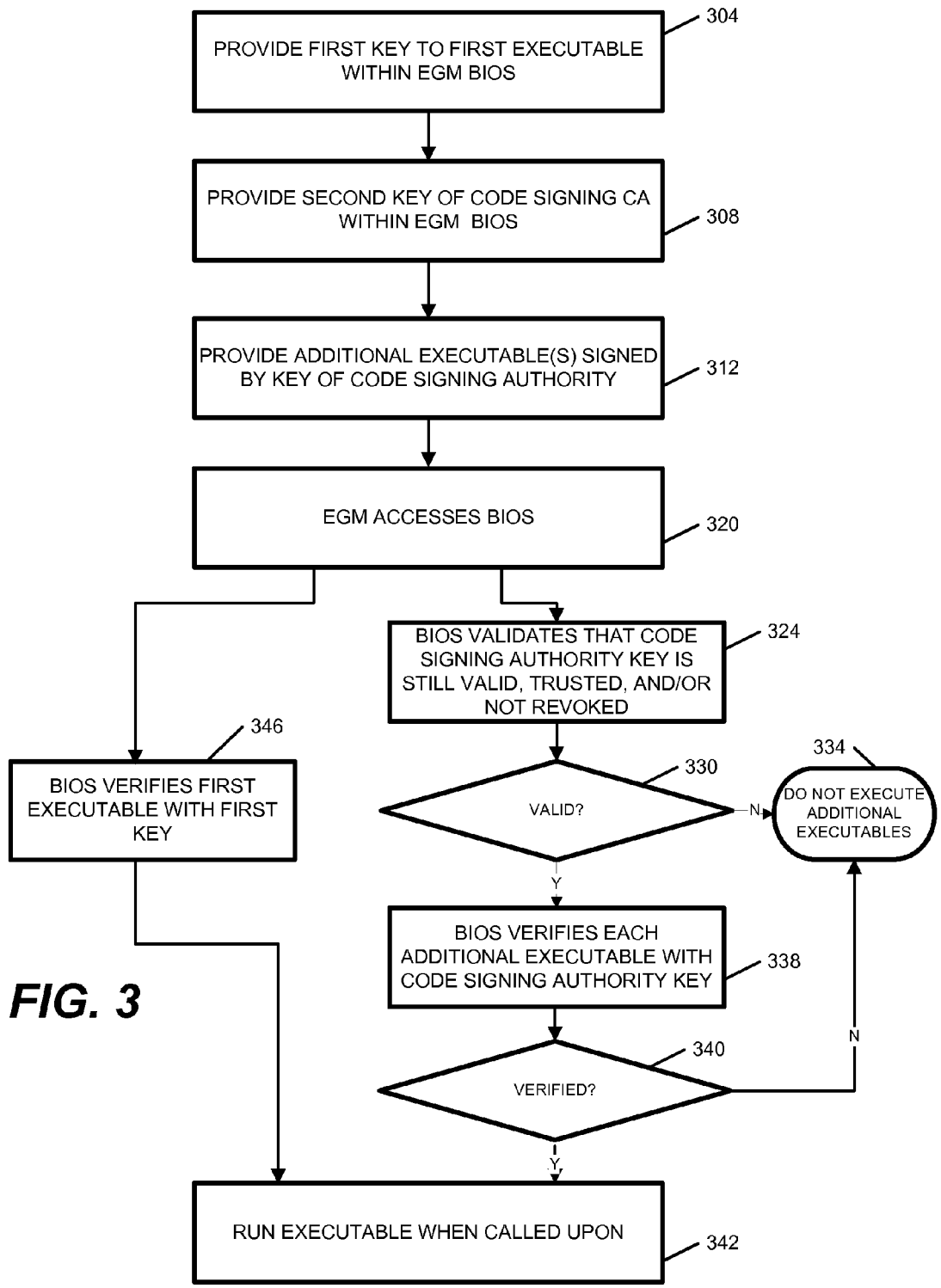
FIG. 3 is a flow diagram of an embodiment of a flexible and extensible security process.

FIG. 3 is a flow diagram of an embodiment of a flexible and extensible security process. In step 304, a first key of a first executable is provided (embedded) within the EGM read only BIOS. For example, the first key may be key 112 seen in FIG. 1B. In step 308, a second key is provided within the EGM read only BIOS. For example, the second key may be key 108 to applications 110B-X. This key may, for example, be a key of an intermediary such as a code signing CA. The certificate authority in one embodiment is a game manufacturer licensed by a regulatory agency or the regulatory agency or regulatory agency designee. For example IGT may act as a CA or the Nevada Gaming Control Board or its designee could act as a CA. In an embodiment where the third party is a code signing authority, the key of the code signing authority can be used to sign applications of different providers, and the key of the code signing authority can be authenticated using the public key of the trusted code signing CA in the BIOS of the EGM. Even after an EGM is shipped to a customer with the code signing CA's public key embedded in the BIOS the security measures and mechanisms of the present invention allow the code signing CA to create an additional code signing authority with its own unique private and public key pair. The newly created code signing authority could sign a new gaming application for the shipped EGM and the EGM would authenticate that the gaming application was signed by the Code Signing Authority that is authorized by the trusted code signing CA whose public key is embedded in the BIOS. This flexibility or extensibility is provided even though the EGM software is certified and cannot change due to jurisdictional security requirements. In step 312, additional executables signed by the key of the third party are provided to the EGM.

In prior solutions, a third party application provider would have to submit the application to the EGM manufacturer for it to be signed with the manufacturer's private key. Some third party providers find it undesirable to submit their code to an EGM manufacturer for various reasons. This is not required in embodiments of the present invention, which should alleviate this concern of the third party providers. In embodiments of the present invention, a third party provider may submit its application code to a trusted third party verifier or its own Code Signing Authority with the code signing certificate that is issued by the code signing certificate authority of EGM manufacturer. The third party verifier, e.g. the code signing authority will sign the code with its private key, and the EGM/EGM manufacturer can authorize the third party verifier. For example company ABC can generate its own private and public key and request a code signing certificate from a code signing certificate authority. The code signing CA will then issue a certificate with the ABC's public key, and ABC can receive the code signing certificate and sign using its own private key that corresponds to the public key in the code signing certificate and put the certificate from the code signing CA in the signature file of the application.

In step 320, the EGM accesses and executes the BIOS OS/code 154 and verification executable 152 with the EGM microprocessor. In step 346 the EGM BIOS verifies the first executable with the first key.

In step 324, the EGM, through its BIOS code and verification utility (which may be considered part of the BIOS code), validates that the code signing authority key is currently valid and/or not revoked. This was as described with regard to FIG. 2C and will be discussed with regard to FIG. 4. If, as seen in step 330 it is not currently valid, any of the executables signed with the key will not be executed as seen in step 334. In one embodiment of the invention, if the verification application finds that the key is expired but it is trusted, and not revoked, the EGM may simply warn the user that the key expired and wait for the EGM owner/operator's input before executing the code. If, however the key is still valid, trusted, and not revoked, the EGM (BIOS) verifies each additional executable in step 340 with the code signing authority key in step 338. If any executable is not verified, it will also not be executed as seen in step 334. If the EGM finds any executable that it can't authenticate, the EGM may stop all of its functionality with the warning message on the screen stating that the EGM found an unauthorized executable. Then in step 342 the EGM will run the verified executable(s) when appropriate.

Figure 4:
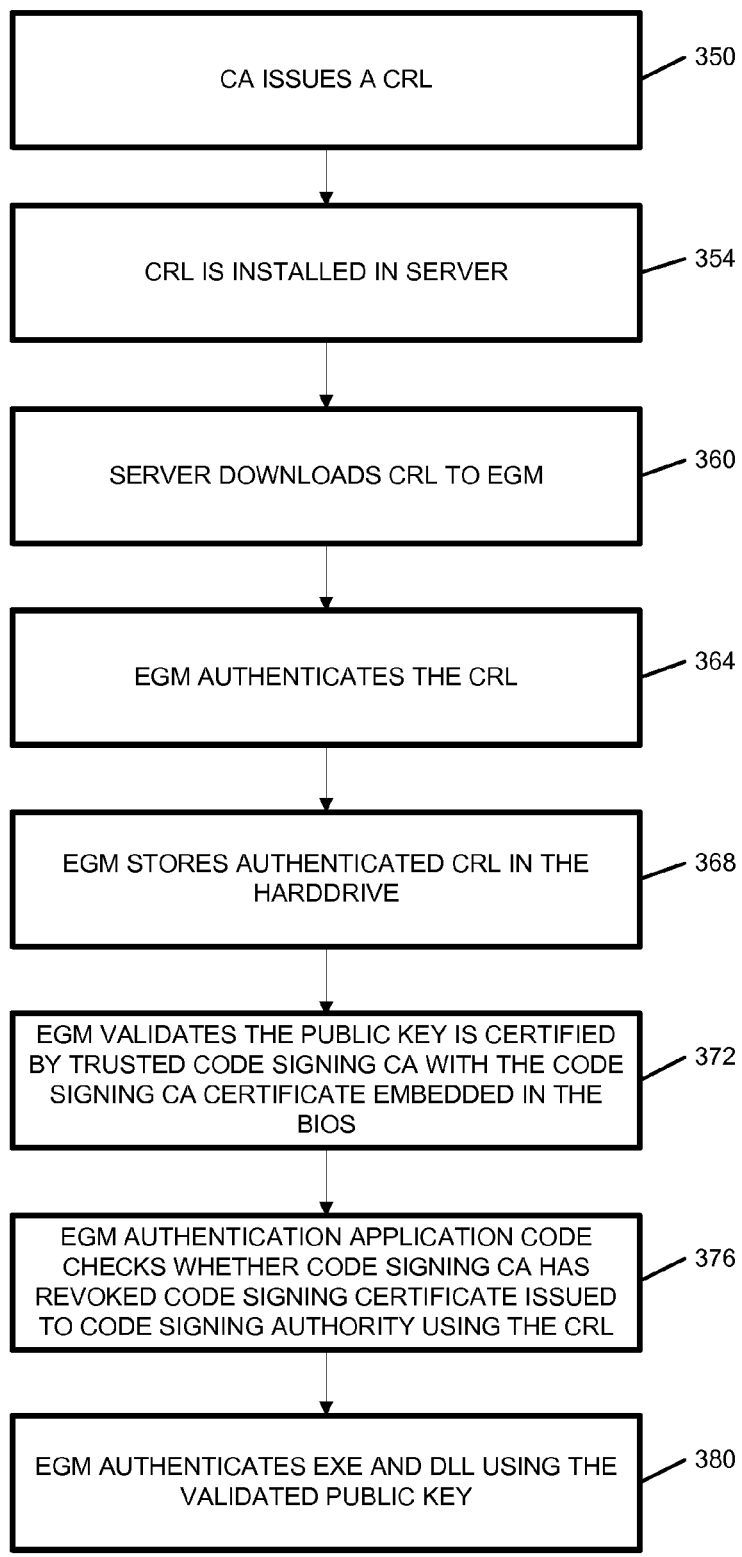
FIG. 4 is a flow diagram of an embodiment of a validation process of step 324 together with some other steps.

FIG. 4 is a flow diagram of an embodiment of a validation process of steps 324-340 together with some other steps. In this embodiment a public key infrastructure is utilized. It should however, be noted that use of a public key infrastructure is not necessary in all embodiments.

In step 350 a CA revokes a Code signing Certificate and issues a CRL. Then in step 354, the CRL is installed in a server such as server 105 in FIG. 1A. This may be through portable media or over a network connection 118. Then in step 360 the server downloads the CRL to the EGM. In step 364, the EGM authenticates the CRL by verifying the digital signature in the CRL by the trusted code signing CA public key embedded in the BIOS. In step 368, the EGM stores the authenticated CRL 176 in mass storage drive 132 and/or NVRAM 128. Then in step 372 the EGM validates that the public key is certified by a trusted code signing CA with the code signing CA certificate embedded in the BIOS chip using certificate chain validation. In step 376, EGM authentication application code checks whether the relevant code signing CA has revoked a code signing certificate issued to the relevant code signing authority using the CRL. The CRL file contains the list of code signing certificate serial numbers that are revoked by the code signing CA; if the code signing certificate contains the serial number that matches the serial number in the CRL, the EGM authentication application will not authenticate the application using the public key within the revoked certificate. The first time this occurs after a re-boot, it is done using the BIOS, as the operating system has not yet been started. As such, the BIOS authentication application code, which comprises verification executable 152 alone or in combination with BIOS code/OS 154, when executed by the microprocessor, performs this check.

When authenticating the CRL, the verification utility shall authenticate that the CRL file was issued by the trusted Code Signing CA by authenticating the CRL file using the Code Signing CA's public key, and, after the authentication, verify that the CRL files are not expired. If the EGM receives an updated CRL file and the issued date of the CRL file is later than the CRL file it already had, then the EGM will overwrite or remove the previous CRL file, and store the updated CRL file in the hard drive. For the BIOS, when it boots, it may not have the access to the hard drive to read the CRL file, and in such an embodiment, the EGM will store a copy of the CRL file in the NVRAM after authentication of the CRL so that the BIOS mechanisms can access the CRL file from NVRAM.

As an alternative to the use of a CRL, in embodiments where the EGM has access to an wide area (e.g. Internet)

network connection, the online certificate status protocol ("OCSP") may be utilized. OCSP is an Internet protocol used for obtaining the revocation status of a digital certificate. It is described in RFC 2560, which is hereby incorporated by reference in the entirety. The OCSP will indicate to the EGM whether a certificate issued to a code signing authority by a code signing CA has been revoked or not.

In step 380, the EGM (BIOS) authenticates the executable application (including any associated library or .dll file) using the validated public key. In a preferred embodiment this is done using the BIOS code before the operating system is started. A similar check may be made periodically (e.g. daily or weekly etc) after the OS is running with the authenticated verification utility 172 in drive 132.

It is possible that the public key may fail to authenticate one of the gaming files in EGM hard drive. In one embodiment, if this happens, the verification utility will find the signature file that corresponds to the unauthenticated file, and verify if the CSA certificate contains the same public key. If not, the verification utility will authenticate if the CSA certificate is trusted using the certificate chain validation up to the trusted code signing CA certificate in the BIOS and determine if it can be trusted, and if it is trusted, and valid, it will then use the public key in the certificate to authenticate the failed file.

Figure 5:
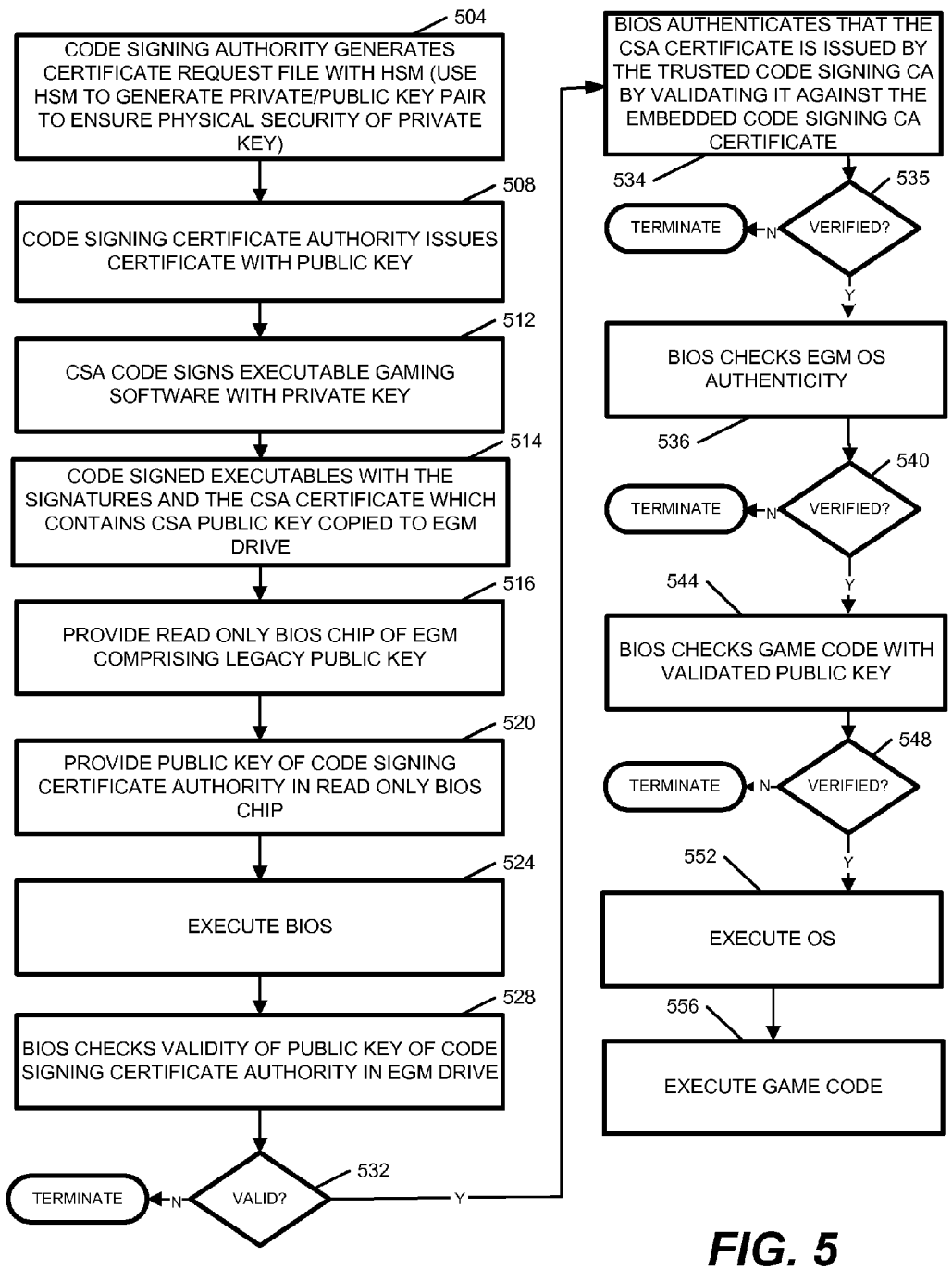
FIG. 5 is a flow chart illustrating an embodiment of security provisioning with a public key infrastructure ("PKI").

FIG. 5 is a flow chart illustrating another embodiment of a process of security provisioning, utilizing a public key infrastructure. In step 504, a code signing authority generates a certificate request with the private and public key pair from an HSM of the CSA. The HSM is used to generate private/public key pairs to ensure the physical security of the private key, as discussed above. In step 508 a code signing certificate authority issues a certificate comprising a public key of the CSA private/public key pair. Then in step 512 the CSA code signs executable gaming software with the private key of the pair. In step 514, the code signed executable with the signatures and the CSA certificate which contains the CSA public key is copied to the EGM drive. This may be with portable media or over a network. In step 516, a read only BIOS chip is provided with the legacy public key embedded therein. In step 520, the public key of the code signing certificate authority is provided/embedded within the read only BIOS chip.

In step 524 the BIOS code/OS is executed by the processor of the EGM. The EGM (BIOS) then checks the validity of the public key of the code signing certificate authority in the EGM drive in step 528. If it is not valid, EGM operation may terminate, as seen in step 532. Then in step 534, the EGM (BIOS) authenticates that the CSA certificate is issued by the code signing CA by validating it against code signing CA certificate 108 (or root certificate 140) embedded in the BIOS chip using the certificate chain validation. If it is not authenticated, the EGM may terminate operation as seen in step 535. In step 536 the EGM (BIOS) checks the operating system authenticity, and in step 544 the EGM (BIOS) checks the game code with the validated public key. If either check is unsuccessful, the EGM may terminate operation as seen in steps 540 and 548. If the operating system and game code have been verified, they are executed by the processor of the EGM, as seen in steps 552 and 556, respectively.

It should be understood that the steps of the above process, and indeed all processes and steps in this specification can be varied and need not necessarily be performed in the order presented.

Gaming Machine Vs. General-Purpose Computer

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that enables the first state to be reconstructed is stored. This feature enables the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

In particular embodiments, a state of a gaming device may be reconstructed from game history information stored in multiple locations. For instance, in one embodiment, a gaming device operable to provide an ECI and a game interface simultaneously may not store state information for the ECI but only for the game interface. Thus, to reconstruct the state of gaming device including the ECI in a dispute, after a malfunction or after a power-failure, game history information may have to be retrieved from a local memory source on the gaming device and a remote memory source located on a remote host that provides the ECI. For example, the remote and gaming machine may store correlation information, such as timing information or referential information, that allows events on the gaming machine to be correlated to events occurring on the remote host. The correlation information stored at the gaming machine and/or remote host may be used to synchronize the reconstruction of a game state on the gaming machine. In a particular embodiment, a remote host that provides ECI services to a gaming device may provide an ECI that allows archival information regarding ECIs displayed on a gaming device to be retrieved.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming machine environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

While the invention has been particularly shown and described with reference to specific embodiments thereof, it will be understood by those skilled in the art that changes in the form and details of the disclosed embodiments may be made without departing from the spirit or scope of the invention In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:
1. A system for providing and verifying gaming software for use in a wager based gaming machine, the system comprising:
    a certificate authority configured to
        receive authorization of a gaming machine manufacturer to sign executable code of the gaming application on behalf of the gaming machine manufacturer,
        the certificate authority configured to delegate authority to sign the executable code to a code signing authority, on behalf of the gaming machine manufacturer, the code signing authority configured to
receive authorization from the certificate authority and sign the executable code of the gaming application on behalf of the gaming machine manufacturer; and an electronic gaming machine comprising a read only BIOS chip and a public key of a code signing certificate authority embedded within the BIOS chip, wherein the gaming machine is configured to execute BIOS instructions of the read only BIOS chip, the BIOS instructions configured to:
check the validity of the public key of the code signing certificate authority;
bypass terminate operation of the gaming machine after determining that the public key of the code signing authority is valid and trusted;
check game code with the public key of the code signing authority after determining that the public key is valid and trusted;
check the authenticity of an operating system of the gaming machine;
terminate operation of the gaming machine after determining that the authenticity of the operating system is not authentic; and
cause the gaming machine to execute the operating system after determining that the authenticity of the operating system is authentic.

2. The system of claim 1, wherein the gaming machine further comprises a key of a gaming machine manufacturer supplied legacy application within the read only BIOS chip.

3. The system of claim 1, wherein in order to replace or update a key, a dedicated hardware security module is removed and replaced.

4. The system of claim 1, wherein the certificate authority is further configured to maintain a certificate revocation list.

5. The system of claim 4, wherein the gaming machine is configured to receive the certificate revocation list at the gaming machine over a network connection and maintain the certificate revocation list within a drive of the gaming machine.

6. The system of claim 4, wherein the gaming machine is configured to check the revocation list and determining whether a permission to sign using said second key has been revoked.

7. The system of claim 1, wherein the gaming machine comprises the operating system within a drive of the gaming machine, and wherein the gaming machine comprises a key of the gaming machine manufacturer within the read only BIOS chip.

8. The system of claim 7, wherein the BIOS instructions are configured to verify a signature of the operating system with the gaming machine manufacturer key stored within the read only BIOS chip.

9. The system of claim 1, wherein the electronic gaming machine is configured to validate that the permission of the certificate authority is not revoked by:
sending an online certificate status request to the certificate authority over the network; receiving an online certificate status response; and
verifying the online certificate status response.

10. A method of verifying gaming software for use in a gaming machine, the gaming machine including a read only BIOS chip and a public key of a code signing certificate authority embedded within the BIOS chip, the code signing certificate authority being authorized by a certificate authority to sign executable code on behalf of a gaming machine manufacturer, the method comprising:

checking, by a processor the gaming machine, the validity of the public key of the code signing authority;
bypassing, by the processor, terminate operation of the gaming machine after determining that the public key of the code signing authority is valid and trusted;
checking, by the processor, game code with the public key of the code signing authority after determining that the public key is valid and trusted;
checking, by the processor, the authenticity of an operating system of the gaming machine;
terminating, by the processor, operation of the gaming machine after determining that the authenticity of the operating system is not authentic; and
causing, by the processor, the gaming machine to execute the operating system after determining the authenticity of the operating system is authentic.

11. The method of claim 10, wherein the certificate authority is configured to maintain a certificate revocation list.

12. The method of claim 11, further comprising:
receiving the certificate revocation list at the gaming machine over a network connection; and
maintaining the certificate revocation list within a drive of the gaming machine.

13. The method of claim 11, further comprising checking the revocation list to determine whether a permission to sign using said second key has been revoked.

14. The method of claim 10, wherein the gaming machine comprises the operating system within a drive of the gaming machine, and wherein the gaming machine comprises a key of the gaming machine manufacturer within the read only BIOS chip.

15. The method of claim 14, further comprising verifying, by the processor, a signature of the operating system with the gaming machine manufacturer key stored within the read only BIOS chip.

16. The method of claim 10, further comprising validating that the permission of the certificate authority is not revoked by:
sending an online certificate status request to the certificate authority over the network; receiving an online certificate status response; and
verifying the online certificate status response.

17. A non-transitory computer-readable media having computer-executable instructions embodied therein that when executed by a processor of a gaming machine cause the gaming machine to perform operations to verify gaming software for use in the gaming machine, the gaming machine including a read only BIOS chip and a public key of a code signing certificate authority embedded within the BIOS chip, the code signing certificate authority being authorized by a certificate authority to sign executable code on behalf of a gaming machine manufacturer, the operations comprising:
check the validity of the public key of the code signing authority;
bypass terminate operation of the gaming machine after determining the public key of the code signing authority is valid and trusted;
check game code with the public key of the code signing authority after determining the public key is valid and trusted;
check the authenticity of an operating system of the gaming machine;
terminate operation of the gaming machine after determining the authenticity of the operating system is not authentic; and cause the gaming machine to execute the operating system after determining the authenticity of the operating system is authentic.

18. The media of claim 17, wherein the certificate authority is configured to maintain a certificate revocation list.

19. The media of claim 18, wherein the operations further comprise:
   receive the certificate revocation list at the gaming machine over a network connection; and
   maintain the certificate revocation list within a drive of the gaming machine.

20. The media of claim 18, wherein the operations further comprise check the revocation list to determine whether a permission to sign using said second key has been revoked.

21. The media of claim 17, wherein the gaming machine comprises the operating system within a drive of the gaming machine, and wherein the gaming machine comprises a key of the gaming machine manufacturer within the read only BIOS chip.

22. The media of claim 21, wherein the operations further comprise verify a signature of the operating system with the gaming machine manufacturer key stored within the read only BIOS chip.

23. The media of claim 17, wherein the operations further comprise validate that the permission of the certificate authority is not revoked by:
   sending an online certificate status request to the certificate authority over the network;
   receiving an online certificate status response; and
   verifying the online certificate status response.

* * * * *